(12) United States Patent
Haesen

(10) Patent No.: US 10,184,566 B2
(45) Date of Patent: Jan. 22, 2019

(54) VALVE UNIT INCLUDING A MECHANICAL COUPLER

(71) Applicant: Bosal Emission Control Systems NV, Lummen (BE)

(72) Inventor: Vik Haesen, Tessenderlo (BE)

(73) Assignee: Bosal Emission Control Systems NV, Lummen (BE)

( * ) Notice: Subject to any disclaimer, the term of this patent is extended or adjusted under 35 U.S.C. 154(b) by 32 days.

(21) Appl. No.: 15/217,204

(22) Filed: Jul. 22, 2016

(65) Prior Publication Data

US 2017/0074407 A1 Mar. 16, 2017

(30) Foreign Application Priority Data

Sep. 14, 2015 (EP) .................................... 15185122

(51) Int. Cl.
*F16K 1/22* (2006.01)
*F02D 9/10* (2006.01)
(Continued)

(52) U.S. Cl.
CPC .............. *F16K 1/221* (2013.01); *F01N 1/065* (2013.01); *F01N 1/16* (2013.01); *F01N 1/163* (2013.01);
(Continued)

(58) Field of Classification Search
CPC ...... F16K 1/221; F16K 31/041; F16K 31/043; F16K 1/223; F02D 9/1065; F02D 9/107; F02M 26/26; F02M 26/69; F01N 1/16; F01N 1/163; F01N 13/08; F01N 2240/36; F01N 2260/20; F01N 2290/00;
(Continued)

(56) References Cited

U.S. PATENT DOCUMENTS 5,334,095 A 8/1994 Colling et al.
5,632,304 A * 5/1997 Kempka ................... F02D 9/06
137/595
(Continued)

FOREIGN PATENT DOCUMENTS

DE 10207060 A1 8/2003
DE 102004043662 B3 2/2006
(Continued)

OTHER PUBLICATIONS

Extended European Search Report for European Patent Application No. 15185122.7, dated Apr. 1, 2016.

*Primary Examiner* — Reinaldo Sanchez-Medina
*Assistant Examiner* — David Colon Morales
(74) *Attorney, Agent, or Firm* — Merchant & Gould

(57) ABSTRACT

A valve unit with a valve having a valve shaft with a rotational axis. The valve unit including an actuator having an actuator shaft with a rotational axis. The valve unit includes a mechanical coupler for rotational coupling of the actuator shaft and the valve shaft. The mechanical coupler includes a rotational axis coinciding with the rotational axis of the actuator shaft and the rotational axis of the valve shaft. The valve unit includes a first rotational member coupled to the actuator shaft and a second rotational member coupled to the valve shaft. The valve unit includes a bridge element. The first and the second rotational members include slots for receiving engagement pins of the bridge element.

19 Claims, 8 Drawing Sheets

(51) Int. Cl.
   *F02M 26/69*   (2016.01)
   *F01N 1/06*    (2006.01)
   *F01N 1/16*    (2006.01)
   *F01N 13/08*   (2010.01)
   *F16K 25/00*   (2006.01)
   *F02M 26/26*   (2016.01)
   *F02M 26/48*   (2016.01)
   *F16K 31/04*   (2006.01)

(52) U.S. Cl.
   CPC ............. *F01N 13/08* (2013.01); *F02D 9/107* (2013.01); *F02D 9/1065* (2013.01); *F02M 26/26* (2016.02); *F02M 26/48* (2016.02); *F02M 26/69* (2016.02); *F16K 1/223* (2013.01); *F16K 25/005* (2013.01); *F16K 31/043* (2013.01); *F01N 2240/36* (2013.01); *F01N 2260/14* (2013.01); *F01N 2260/20* (2013.01); *F01N 2290/00* (2013.01); *F01N 2390/00* (2013.01)

(58) Field of Classification Search
   CPC ......... F01N 2390/00; Y10T 137/87161; Y10T 137/87772; Y10T 137/0525; Y10T 137/6048
   USPC .................. 251/305–308, 129.11, 129.13
   See application file for complete search history.

(56) References Cited

U.S. PATENT DOCUMENTS

| | | | | |
|---|---|---|---|---|
| 6,263,917 | B1 * | 7/2001 | Evans | F02D 9/101 137/595 |
| 6,598,619 | B2 * | 7/2003 | Gagnon | F16K 1/221 123/323 |
| 6,748,967 | B1 * | 6/2004 | Smiltneek | F16K 1/221 137/315.17 |
| 2003/0056836 | A1 | 3/2003 | Gagnon | |
| 2006/0059902 | A1 | 3/2006 | Gerards et al. | |
| 2008/0115494 | A1 | 5/2008 | Willats et al. | |
| 2010/0144452 | A1 * | 6/2010 | Muenich | F16D 3/04 464/105 |
| 2012/0280161 | A1 | 11/2012 | Weidner et al. | |
| 2013/0270470 | A1 | 10/2013 | Bonanno et al. | |

FOREIGN PATENT DOCUMENTS

| | | |
|---|---|---|
| DE | 102004040817 A1 | 3/2006 |
| DE | 102009016597 A1 | 10/2010 |
| DE | 102009052423 A1 | 5/2011 |
| DE | 102011107024 A1 | 1/2013 |
| DE | 102011107088 A1 | 1/2013 |
| DE | 102014017523 A1 | 6/2015 |
| DE | 102014017524 A1 | 6/2015 |
| FR | 2943114 A1 | 9/2010 |
| JP | 2005083443 A * | 3/2005 |

* cited by examiner

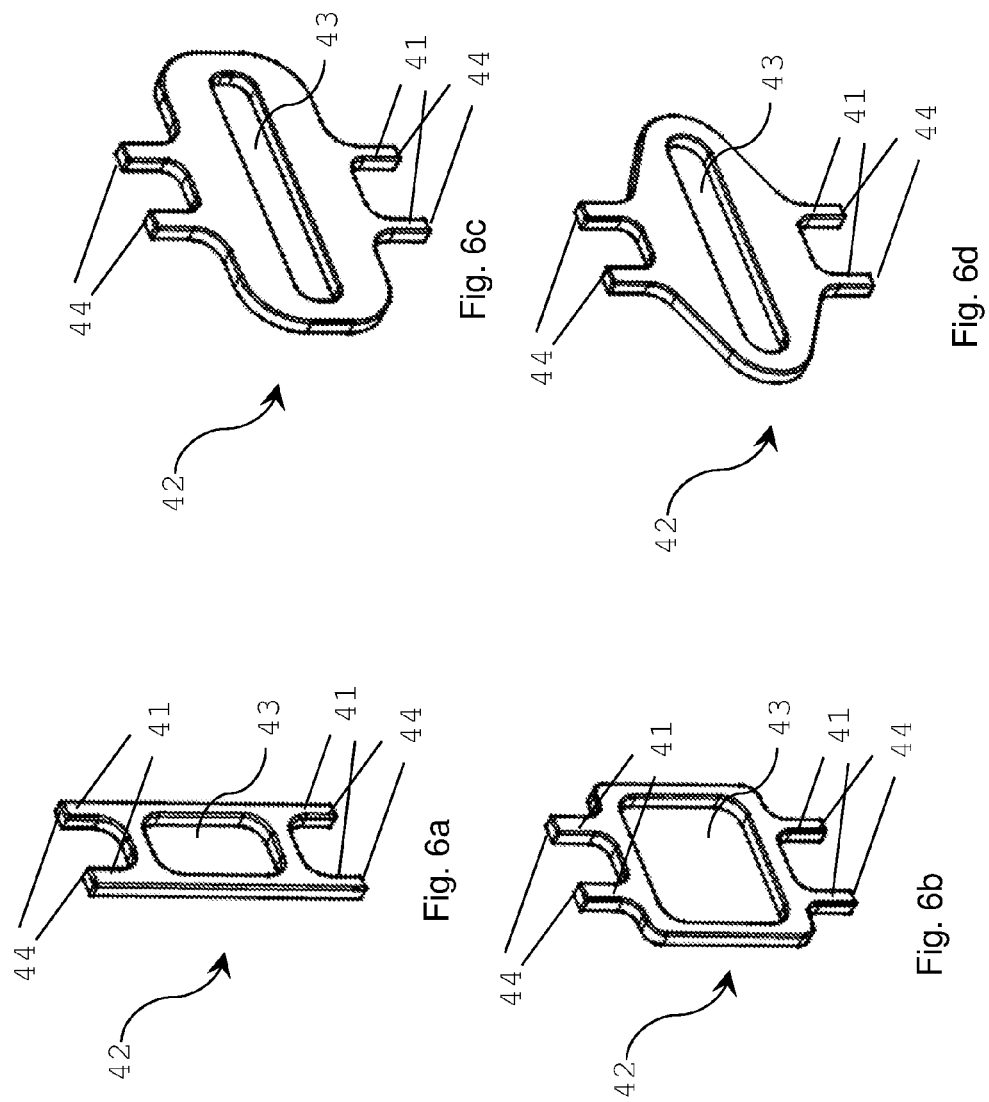

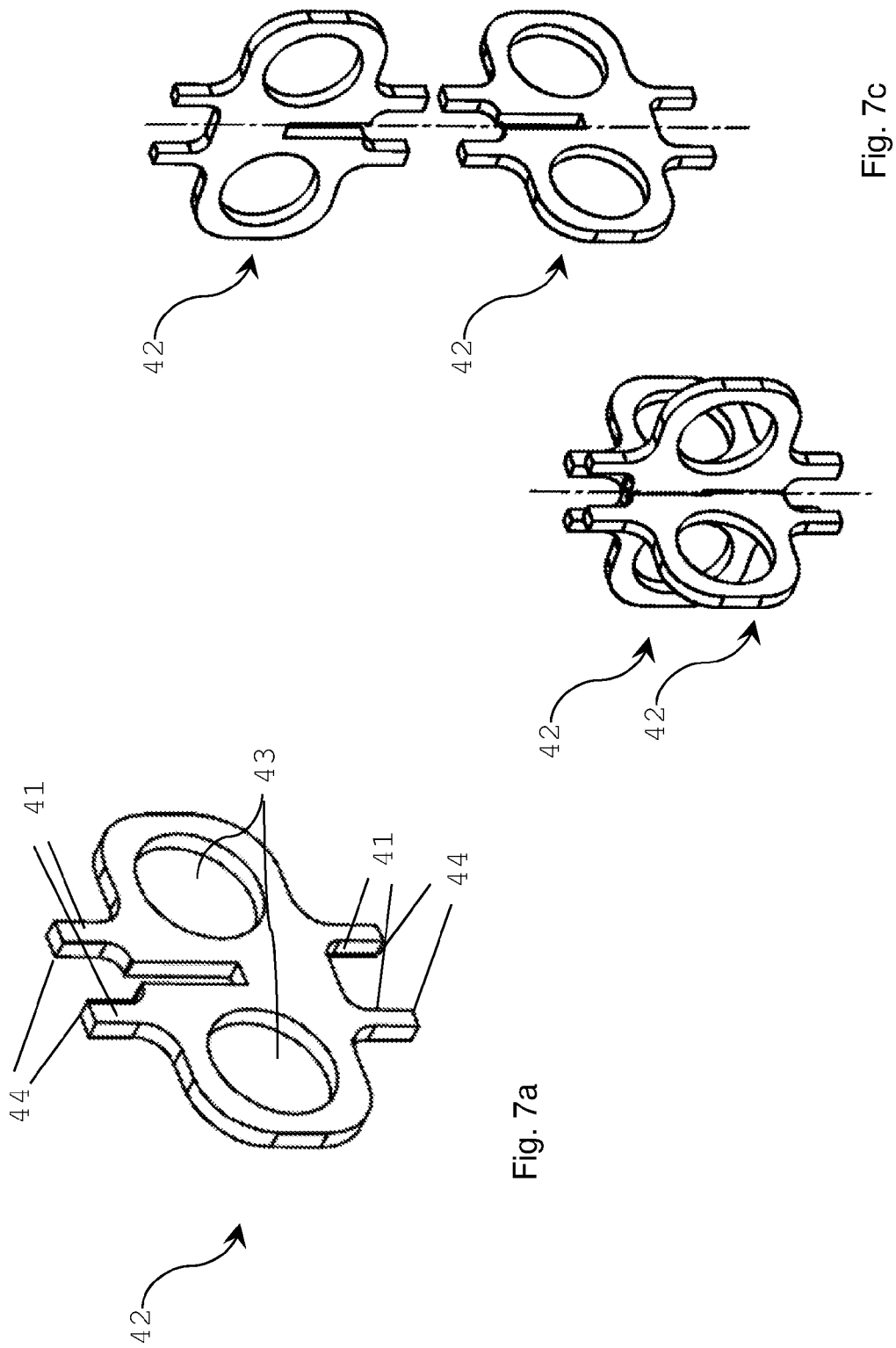

VALVE UNIT INCLUDING A MECHANICAL COUPLER

This application claims benefit of Serial No. 15185122.7, filed on 14 Sep. 2015 in the European Patent Office and which application is incorporated herein by reference. To the extent appropriate, a claim of priority is made to the above disclosed application.

The present invention relates to a valve unit comprising a mechanical coupler for rotational coupling of an actuator shaft and a valve shaft. In particular, the invention relates to a valve unit having a mechanical coupler for actuating a valve for controlling the flow rate of gas, particularly exhaust gas of an internal combustion engine of a motor vehicle, for example a car, through the passage of the valve.

The automotive industry is more and more oriented in the design of engines, on-board systems and the vehicle itself, towards the reduction of fuel consumption, emission of pollutants, recyclability of materials, reduced noise levels, and the recovery and conversion of thermal energy that would otherwise be dissipated.

Active noise control becomes more and more applied in exhaust systems, particularly for use in exhaust systems for combustion engines with cylinder deactivation technology, the cylinder deactivation generally occurring during partial load operation of the engine. Under partial load, these engines will switch off one or more cylinders leading to significant deterioration of the noise. Active acoustical valves, generally active acoustic butterfly valves, are used to this purpose. The acoustic valves can be switched from fully closed over any intermediate position to fully open position by an actuator to optimize the noise reduction depending on the vehicle operating conditions. Hence, active acoustical valves allow for an optimal noise level in all operating conditions of the engine with internal combustion.

As regards the recovery and conversion of thermal energy, the exhaust gas exiting from the internal combustion engine carries, after being treated by a catalyst or by a more complex treatment unit, an amount of thermal energy that can be recovered for various useful purposes. For example, it has been suggested to recover the thermal energy from the exhaust gas for the purpose of heating the cabin (by more rapidly heating up the cooling water of the engine) of the vehicle, for more rapidly heating up the lubricating oil to the optimum temperature (lower viscosity) after a cold start of the engine, or for converting the thermal energy into electrical energy (with the aid of a suitable converter).

In an exhaust gas heat recovery system (EGHRS), for example, heat from vehicle exhaust gases may be transferred to other vehicle components via a liquid coolant in order to provide faster heating of air and vehicle fluids on start-up of the vehicle, thereby reducing fuel consumption. Air heated by the exhaust gases can be used for rapid heating of the passenger compartment and for window defrosting, reducing the need for long idling periods during start-up in cold weather. Heating of vehicle fluids such as engine oil and transmission fluid makes them less viscous and improves fuel economy during start-up. After the initial start-up period the recovery of heat from the exhaust gases is no longer desired. Therefore, EGHR systems typically include a bypass to minimize heat transfer from the exhaust gases to the liquid coolant once the vehicle reaches normal operating temperature. A bypass valve is therefore operated by an actuator for regulating the exhaust gas flow either over the heat exchanger or through the bypass. The bypass regulation helps to minimize the load on the cooling system after warm up of the engine. Furthermore, the pressure loss, even being reduced by novel techniques, in the heat exchanger would penalize the overall performance of the engine if used continuously.

Heat recovery components are particularly arranged comparatively close to the engine where the temperature of the exhaust gas stream is very high in order to use the thermal energy (heat) contained in the exhaust gas stream as effectively as possible. However, in the direction of flow of the exhaust gas stream out of the engine, a manifold is connected to the outlets of the engine, which is then typically followed by the turbocharger and the exhaust gas treatment components (e.g. catalytic converter, particle filter, etc.). Further in the direction of the flow of the exhaust gas stream, the heat recovery component may then be arranged. Accordingly, depending on the given spatial circumstances the heat recovery component is particularly arranged either in the engine compartment of the motor vehicle or at the beginning of the "tunnel" for accommodating the various components of the exhaust gas system (mufflers, pipes, etc.), this "tunnel" being provided in the chassis of the motor vehicle.

Hence, these bypass valves for EGHR systems or acoustical valves are in fluidic contact with the exhaust gasses generated by the internal combustion engine, which gasses may attain very high temperatures of up to 1050° C. for petrol engines. The actuator, however, generally is designed to withstand a temperature of only max. 150° C., frequently only up to 120° C.

Due to the very limited space both in the engine compartment but even more in the tunnel provided in the chassis of the motor vehicle, there is extremely limited space available for accommodating the components of the exhaust gas system. Accordingly, the more voluminous the component is the more difficult it is to arrange the component in the engine compartment or in the "tunnel" provided in the chassis of the motor vehicle.

In the case of the coupler shown in US2003/0056836, the thermal decoupling is obtained by the use of a coupling member being made of one single part which is resilient with respect to the first and second shafts. Due to the single part construction, the thermal decoupling may be insufficient for the use in high temperature applications and therefore would need disadvantageous distances for sufficiently reducing the temperature towards the actuator, hence leading to large parts which cannot be accommodated in the small space available in the engine compartment or in the "tunnel" provided in the chassis of the motor vehicle. Furthermore, the resilient assembly of the coupling member, in particular constructed of a resilient material that provides flexibility, does not allow for exact read-out of the valve position of the valve being actuated, the valve position being determined by a sensor which would have to be arranged in the actuator for thermal reasons. Indeed, a sensor reads-out the angular position of the actuator shaft, which is generally not coinciding with the angular position of the valve shaft when the resilient coupling member deforms due to the applied torque.

It is therefore an object of the invention to suggest a valve unit which overcomes the above mentioned drawbacks and offer an improved valve unit.

These and other objects are achieved by the heat recovery component according to the invention, as it is specified by the features of the independent claim. Further advantageous aspects of the heat recovery component according to the invention are the subject of the dependent claims.

Particularly, a valve unit comprising a mechanical coupler for rotational coupling of an actuator shaft and a valve shaft is suggested.

The invention relates to a valve unit in particular for controlling the flow rate of an exhaust gas through the passage of a valve, the valve unit comprising a valve having a valve housing, and at least one valve flap arranged in the housing, the at least one valve flap being fixedly arranged on a rotatable valve shaft having a rotational axis, an actuator for actuating the valve flap, the actuator having an actuator shaft with a rotational axis, a mechanical coupler for rotational coupling of the actuator shaft and the valve shaft, the actuator shaft and the valve shaft being coaxial, the mechanical coupler comprising a rotational axis coinciding with the rotational axis of the actuator shaft and the rotational axis of the valve shaft, a first rotational member coupled to the actuator shaft and a second rotational member coupled to the valve shaft, and a bridge element for transmitting a force, particularly a torque between the first rotational member and the second rotational member, the first and the second rotational members having slots for receiving engagement pins of the bridge element, wherein the bridge element has a planar shape extending from the first rotational member to the second rotational member, and the planar bridge element has a body and at least two engagement pins projecting from the body of the planar bridge element at each of two of opposite ends of the body of the planar bridge element in a parallel direction to the rotational axis of the mechanical coupler, the engagement pins engaging with the corresponding slots in the rotational members, and the planar bridge element comprising at least one through-hole traversing the plane of the body of the planar bridge element extending from the first rotational member to the second rotational member.

The valve unit according to the present invention has the advantage to offer excellent temperature drop between the valve shaft of the exhaust valve through which gases with a temperature of up to 1050° C. may pass and an electric actuator which usually may be operated at temperatures up to 120° C. Additionally, the valve unit according to the invention allows for temperature drop over a very short distance and still transmit the actuator forces and torque axially to the valve, in particular to the valve. This temperature drop over a very short distance is obtained on one hand by an improved thermal decoupling due to the three part construction of the mechanical coupler. The heat conduction path is additionally interrupted by the strong decoupling at the interface between the slots of each of the rotational members and the corresponding pin area of the engagement pins of the bridge element resulting in a high thermal resistance and the small contact areas between the components poorly conducting heat. Additionally, reduced heat conduction is achieved by minimized cross-section in planes perpendicular to the rotational axis of the mechanical coupler resulting from the use of the pins and from the through-hole traversing the planar bridge element, leaving only part of the section of the planar bridge.

The temperature drop is additionally increased by enhancing the thermal cooling of the bridge element through maximized heat convection by maximized cooling surface of the bridge element and of the rotational members and radiation from planar section of the bridge element to the surrounding atmosphere. Furthermore, the present inventive mechanical coupler offers accurate read out of the valve position by a sensor, which is particularly arranged in the actuator housing. Indeed, the coupling will have negligible deformation during operation due to the symmetrical structure of the planar bridge element and the increased polar moment of inertia.

Particularly, the at least one through-hole traversing the plane of the body of the planar bridge element extending from the first rotational member to the second rotational member, the through-hole traverses the body of the planar bridge element in a direction normal to the plane formed by the body of the planar bridge element.

The planar bridge element according to the present invention is particularly symmetrical in two orthogonal planes intersecting at the rotational axis of the mechanical coupler. In particular, the planar bridge element according to the invention is symmetrical along the sagittal plane and along the coronal plane of the mechanical coupler.

In the framework of the present invention, the sagittal plane is a vertical plane dividing the body of the planar bridge element into right and left halves, orthogonal to the plane formed by the body of the planar bridge element and containing the rotational axis of the mechanical coupler. The coronal plane is the plane formed by the body of the planar bridge element that divides the body of the planar bridge element into front and back sections in the plane formed by the planar bridge element and containing the rotational axis of the mechanical coupler. The transverse plane is an imaginary plane that divides the body on the bridge element into superior and inferior parts. The transverse plane is perpendicular to the coronal plane and to the sagittal plane and therefore perpendicular to the rotational axis of the mechanical coupler.

The bridge element or the rotational members are particularly made of metal, particularly steel or cast aluminum, or of ceramic. A metal bridge element or rotational member may be formed by a stamping process or another machining process, or by casting, in particular from cast aluminum.

Additionally, each rotational member and the bridge element may be made of different materials. For example, one rotational member may be made of cast aluminum, the second rotational member may be made of steel and the bridge element may be made of a ceramic material. Of course all combinations are conceivable and not limited to these enumerated materials.

This aspect of the invention shows the versatility of the mechanical coupler according to the present invention for optimal adaptation of the mechanical coupler to the operation conditions. For example, using a ceramic part in the mechanical coupler will additionally enhance the thermal decoupling of the mechanical coupler. This versatility is allowed by the three part construction of the mechanical coupler.

According to another aspect of the valve unit according to the invention, the engagement pins of the planar bridge element have end portions and the distance between the centers of the end portions of the engagement pins engaging the first rotational member differs from the distance between the centers of the end portions of the engagement pins engaging the second rotational member.

This aspect provides the advantage to offer high flexibility of the mechanical coupler according to the invention for optimal adaptation of the first and second rotational members to the space available and to the individual design of the actuator and of the valve. Besides facilitating the torque transfer, a large distance between the centers of the end portions of the engagement pins, allows a more accurate rotational angle read out of the valve position. Therefore, the distance between the centers of the end portions of the engagement pins may be adjusted to the needs of the application.

In accordance with another aspect of the valve unit according to the invention, the mechanical coupler presents a backlash between the slots of the rotational members and the engagement pins of the bridge element engaging the corresponding slots of the rotational members.

This aspect of the invention is particularly advantageous for accommodation with thermal expansions and bending loads in axial and radial direction and to compensate slight misalignments and tolerance deviations of the parts. A larger distance between the centers of the end portions of the engagement pins allows a more accurate rotational angle read out of the valve position when backlash between the slots of the rotational members and the engagement pins is present.

In accordance with a further aspect of the valve unit according to the invention, at least one of the first and second rotational members is a plate, particularly a disc, an elongated plate or a plate in cross shape and is normal to the rotational axis of the mechanical coupler. A plate is particularly to be understood as a flat metal piece, particularly steel or cast aluminum, or a ceramic piece, particularly with a thickness of 1 mm to 4 mm. The rotational member may also include intrusions or extrusions. When rotational members made out of metal are formed by a stamping process or another machining process, these intrusions or extrusions may be formed by this process. A rotational member made out of metal may also be formed by casting, in particular from cast aluminum intrusions or extrusions may be formed during this process. The thickness of the rotational member is to be understood without considering the intrusions or extrusions in the rotational member.

Particularly, the first and second rotational members are parallel disc members or the first and second rotational members are both parallel elongated plates or both plates in cross shape.

These aspects of the rotational members offer advantageous transmission of forces, specifically torque, from the first rotational member to the bridge element and from the bridge element to the second rotational member. Furthermore, the elongated plate or cross shape reduces the radiation of thermal energy from the hot valve shaft to the actuator due to the reduced section of the rotational members. Additionally, the disc members are advantageous as the surface of the rotational disc members maximizes cooling of the disc members and enhances the shield effect of the respective rotational disc member with respect to the valve or to the actuator. The exchange of heat due to radiation between the bridge element on one hand and the rotational members on the other hand is reduced to a minimum as they are arranged perpendicularly to one another.

In accordance with yet another aspect of the invention, the end portions of the engagement pins of the planar bridge element are tapering towards the distal end of the engagement pins over at least part of the end portions, the end portions particularly have a triangular or a trapezoidal shape tapering towards the distal end of the engagement pins.

The terms "proximal" and "distal" are used to describe parts of the bridge element that are respectively close to or distant from the body of the bridge element. Proximal refers to a point at which the engagement pins project from the body of the bridge element, whereas distal refers to the extremity of the engagement pins. Alternatively, when referring to the end portions of the engagement pins, proximal refers to a point of the end portion of the engagement pins closest to the body of the bridge element, whereas distal refers to the extremity of the end portion of the engagement pins.

This aspect allows for easy introduction of the engagement pins into the corresponding slots in the rotational members during assembly of the mechanical coupler. Moreover, this construction also allows for compensating tolerance as, for example, lateral or angular misalignment of the pieces to be assembled.

According to a further aspect of the invention, the end portion of the engagement pins of the planar bridge element have indentations comprising shoulders at the proximal end of the end portion of the engagement pins for locking the bridge element between the first and the second rotational members.

Particularly, the indentations have a shape such that the mechanical coupler has a clearance between the shoulder of the indentation and the respective rotational member.

This aspect of the invention advantageously allows the rotational members to accommodate with thermal expansions and bending loads in axial and radial direction and to compensate slight misalignments and tolerance deviations of the parts.

In accordance with still a further aspect of the valve unit according to the invention, the planar bridge element is spring-biased or magnetically biased for maintaining the bridge element biased in the mechanical coupler. Particularly the bridge element is biased between the two rotational members of the mechanical coupler.

This aspect of the invention advantageously reduces the rattling noise which may occur due to the clearance between the shoulder of the indentation of the bridge element or the backlash between the slots of the rotational members and the end portions of the engaging pins of the bridge element engaging the slots of the rotational members. At the same time, the spring-biased bridge element is allowed to compensate for thermal expansion due to the clearance and/or backlash.

In accordance with yet another aspect of the invention, the planar bridge element has a shape such that two bridge elements may be assembled axially by stacking and thereby forming cross-like shaped assembled bridge elements.

The stacked, cross-shaped assembly of the bridge elements advantageously enhances the stiffness of the assembled bridge elements and allow for transmission of higher torques between the actuator shaft and the valve shaft and still presenting excellent thermal decoupling of the different parts and good temperature drop from the hot valve shaft towards the actuator shaft due to the increased cooling area of the assembled bridge elements.

In accordance with a further aspect of the valve unit according to the invention, the body of the planar bridge element has an elongation in normal direction to the rotational axis of the mechanical coupler, the elongation exceeding by at least 20%, particularly by at least 30% the distance between the centers of at least one pair of the end portions of the engagement pins engaging the first and/or the second rotational member.

The extended conduction length resulting from the elongation of the bridge element according to the invention further increases the temperature drop from the valve shaft to the actuator shaft by decreasing the conduction which is reverse proportional to the conduction length and by increasing the cooling surface.

Particularly, the body of the planar bridge element has at least one elongated through-hole in direction of the elongation of the body of the planar bridge element and traversing the plane of the body of the planar bridge element extending from the first rotational member to the second rotational member (coronal plane).

The radial elongation of the planar bridge element and of the through-hole traversing the bridge element reduces the conduction of thermal energy from one rotational member to the other rotational member by increasing the path length.

The radial elongation of the through-hole traversing the bridge element reduces the cross section through which heat is conducted from one rotational member to the other rotational member, thereby again increasing the resistance for conduction and reducing the heat conduction from one rotational member to the other rotational member. And at the same time good polar moment of inertia to transfer torque is maintained with minimum distortion.

According to a further aspect of the invention, the valve unit comprises a support element for maintaining a defined distance between the actuator shaft and the valve shaft. Particularly the support element may surround at least partially the rotational members and the bridge element and thereby defining an inner volume. The support element may also have openings for allowing the surrounding atmosphere to enter and to exit the inner volume of the support element.

In this aspect of the invention, the support element shields and protects the mechanical coupler to minimize the risk for damage and limits the heat conduction from valve housing to actuator.

The construction with openings in the support element allows for surrounding atmosphere, in particular surrounding air, to cool down the rotational member and the bridge element by freely entering and exiting the inner volume of the support element.

The support element may further comprise a heat shield.

Particularly, the rotational members are made of a metal, particularly steel or cast aluminum, or of a ceramic material, the rotational members (2, 3) particularly having a thickness of 1 mm to 4 mm and the bridge element (4) is made of a metal, particularly steel or cast aluminum, or a ceramic material, the bridge element (4) particularly having a thickness of 0.5 mm to 3 mm Particularly the rotational members are made of a plate of metal, particularly steel or cast aluminum, or of ceramic having a thickness of 1 mm to 4 mm and the planar bridge element is made of a plate of metal, particularly steel or cast aluminum, or of ceramic having a thickness of 0.5 mm to 3 mm.

In another aspect of the valve unit according to the present invention, the actuator comprises a sensor for read-out of the actuator position and hence for the read out of the valve position.

In a further aspect of the valve unit according to the invention, the rotational members each present a central shaft aperture for the actuator shaft and the valve shaft to be inserted into the respective central shaft aperture in the rotational members. Particularly the actuator shaft and the valve shaft do not form an integral part of the respective rotational member. This design of the valve unit further thermally decouples the hot valve shaft from the actuator.

Each and every feature described herein, and each and every combination of two or more of such features, is included within the scope of the present invention provided that the features included in such a combination are not mutually inconsistent. In addition, any feature or combination of features may be specifically excluded from any embodiment of the present invention.

The invention is further described with regard to embodiments, which are illustrated by means of the following drawings, wherein:

FIGS. 6a to 6f show various embodiments for the planar bridge element according to the invention;

FIGS. 7a to 7c depict a further embodiment of a bridge element for being assembled axially and thereby forming cross-like shaped stacked bridge elements;

Figure 1:
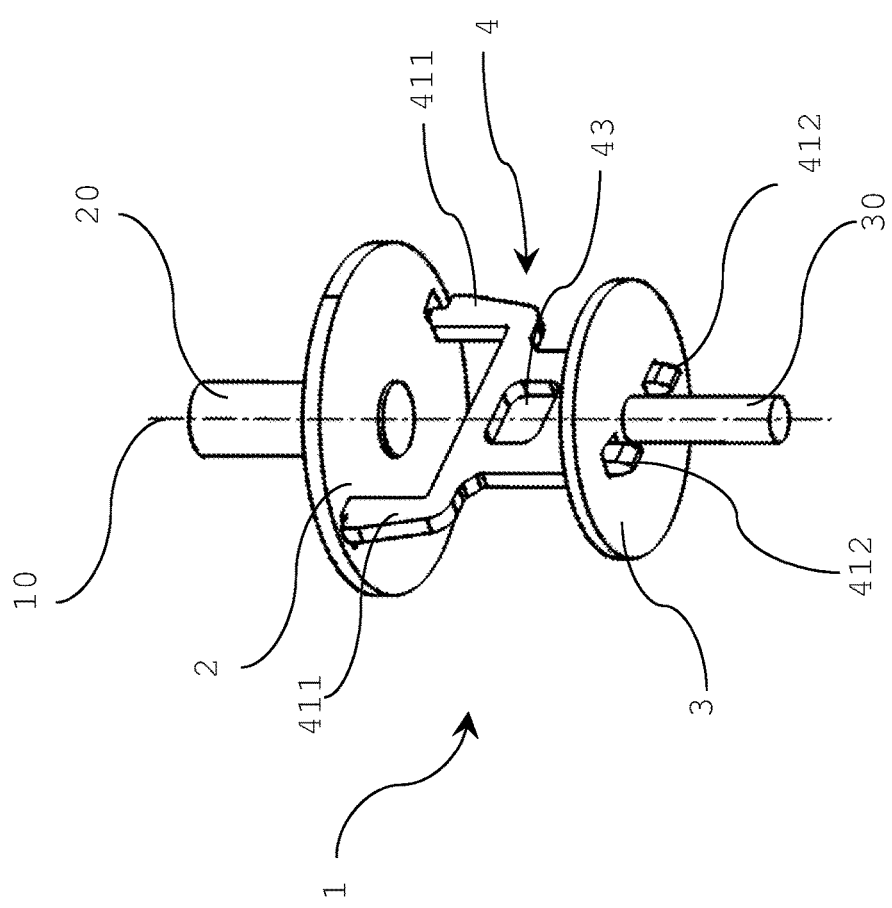
FIG. 1 is a perspective view of a mechanical coupler according to one embodiment of the present invention.

FIG. 1 shows an embodiment of the mechanical coupler 1 of a valve unit according to the present invention in an assembled state. The depicted mechanical coupler 1 is coupled to a first shaft 20 having a rotational axis and a second shaft 30 having a rotational axis, in particular an actuator shaft and a valve shaft, the rotational axis of the first and the second shafts being coaxial and coinciding with the rotational axis 10 of the mechanical coupler 1. The mechanical coupler 1 comprises three parts: two rotational members 2, 3, which have the shape of discs and will therefore be called rotational disc members, and one planar bridge element 4 acting as torque link. All parts 2, 3 and 4 are assembled to form the mechanical coupler 1. The rotational disc members 2, 3 are parallel and their planes are normal to the coaxial first shaft 20 and second shaft 30 and the rotational axis 10.

Figure 6F:
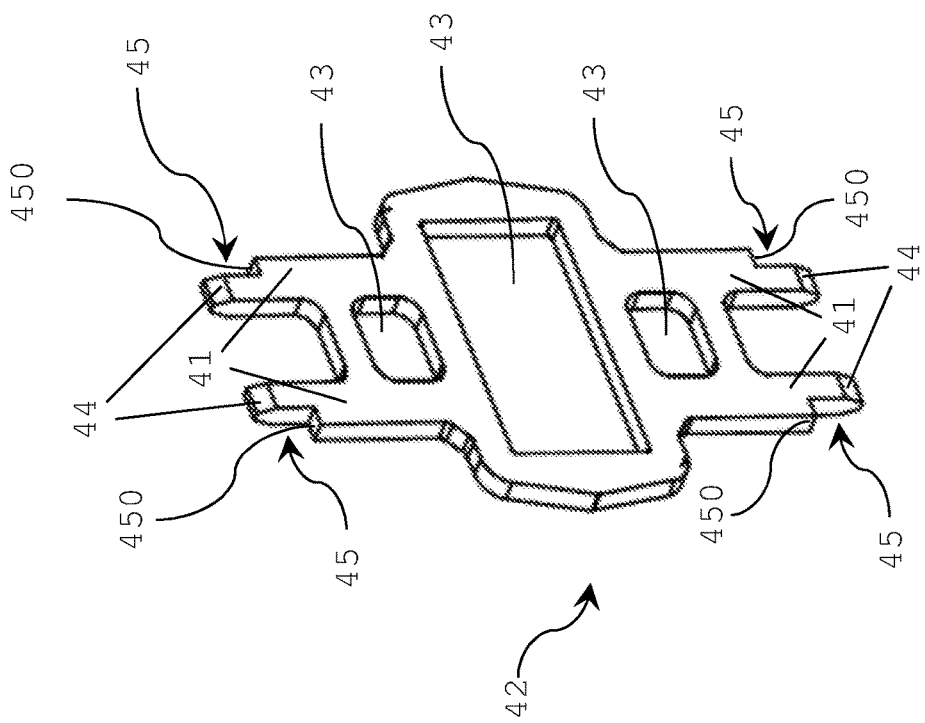

FIG. 1 shows one particular embodiment of the bridge element 4 which has a planar shape extending from the first rotational disc member 2 to the second rotational disc member 3. The bridge element 4 has a body 42 having a through-hole 43 traversing the plane of the bridge element 4 and a pair of engagement pins 41 projecting from the square body 42 in the same plane as the body 42 of the bridge element 4 at each of two of opposite ends of the bridge element 4 and in opposite directions. Of course, in the mechanical coupler, any bridge element according to the invention is usable. Of course, a higher number of through-holes in the bridge element 4 is conceivable for use in the mechanical coupler 1. A further example of a bridge element with three through-holes is illustrated in FIG. 6f.

The distance between the centers of the end portions of a pair of engagement pins 411 engaging the first rotational disc member 2 in this particular embodiment differs from the distance between the centers of the end portions of a pair of engagement pins 412 engaging the second rotational disc member 3. In particular, the distance between the center of the pair of the engagement pins 411 inserted into the rotational disc member 2 coupled to the first shaft 20 is larger than the distance between the center of the pair of the engagement pins 412 inserted into the opposite rotational disc member 3 coupled to the second shaft 30. Particularly, the first shaft 20 is the actuator shaft and the second shaft 30 is the valve shaft, but another configuration is also possible.

Of course, different bridge elements are usable as, for example, having same distance between the centers of the end portions of the pairs of engagement pins. Further examples of bridge elements for the mechanical coupler according to the invention will be described hereinafter.

Preferred distances between the center of the pins engaging the first or the second rotational member 2, 3 are in the range of from 10 to 40 mm.

The first rotational disc member 2 is coupled to the actuator shaft 20, and the second rotational disc member 3 is coupled to the valve shaft 30. The first and the second rotational disc members 2, 3 have slots for receiving the engagement pins 411 and 412 of the bridge element 4. The engagement pins 41 of the bridge element 4 are inserted into the corresponding slots 21, 31 of the disc members 2, 3 for contiguous engagement with the rotational disc members 2, 3, thereby mechanical coupling the two rotational disc members 2, 3. The contiguous engagement of the engagement pins 41 of the bridge element 4 with the slots 21, 31 of the rotational disc members 2, 3, presents a backlash between the slots 21, 31 of the rotational members 2, 3 and the engagement pins 41 of the bridge element 4 engaging the slots 21, 31 of the rotational members 2, 3.

Furthermore, the bridge element 4 has one square through-hole 43 with rounded edges of the square traversing the plane of the bridge element 4 extending from the first rotational disc member 2 to the second rotational disc member 3 for further reducing the thermal conduction from the valve shaft to the actuator shaft and enhancing the thermal cooling of the bridge element 4 by maximizing heat convection from the bridge element to the surrounding atmosphere for superior temperature reduction from the heat emanating from the valve to be actuated. Of course, the through-hole(s) may have any other shape, such as, for example circular, oval, rectangular, V-shaped, trapezoidal, etc.

In particular, the valve to be actuated is a valve for controlling the flow rate of gas, particularly exhaust gas, through the passage of the valve regulated by the valve shaft.

As can also be seen from FIG. 1, the actuator shaft 20 and valve shaft 30 are coaxial. The first rotational member 2 and the second rotational member 3 are coupled by a bridge element 4 which transmits a torque generated by the actuator between the first rotational member 2 and the second rotational member 3. The engagement pins 41 of the bridge element 4 have indentations at their proximal end for locking the bridge element 4 by the shoulders of the indentations between the two rotational disc members 2, 3. Furthermore, the engagement pins 41 of the bridge element 4 are tapering towards their distal end, particularly having an arrow shaped end. This arrow shaped end of the engagement pins 41 allow easy introduction of the engagement pins 41 of the bridge element 4 into the rotational disc members 2, 3 during assembly of the mechanical coupler 1. The actuator may be, for example, an electro-mechanical actuator but is not limited to this particular form of actuator. Any suitable actuator is usable for actuating the valve.

As illustrated in FIG. 1, the first shaft 20 and the second shaft 30 are rotationally coupled by means of the mechanical coupler 1 which engages the end of the first shaft and the end of the second shaft.

The mechanical coupler 1 shown in FIG. 1 is able to transmit a force, in particular a torque, from an actuator 6 to a valve 7, and offer excellent thermal decoupling due to the three parts assembly. The mechanical coupler 1 is also configured to provide a ready indication of the rotational position of the shaft 30 and thus of the position of a valve to a sensor 61, particularly situated in the actuator 6.

Figure 2:
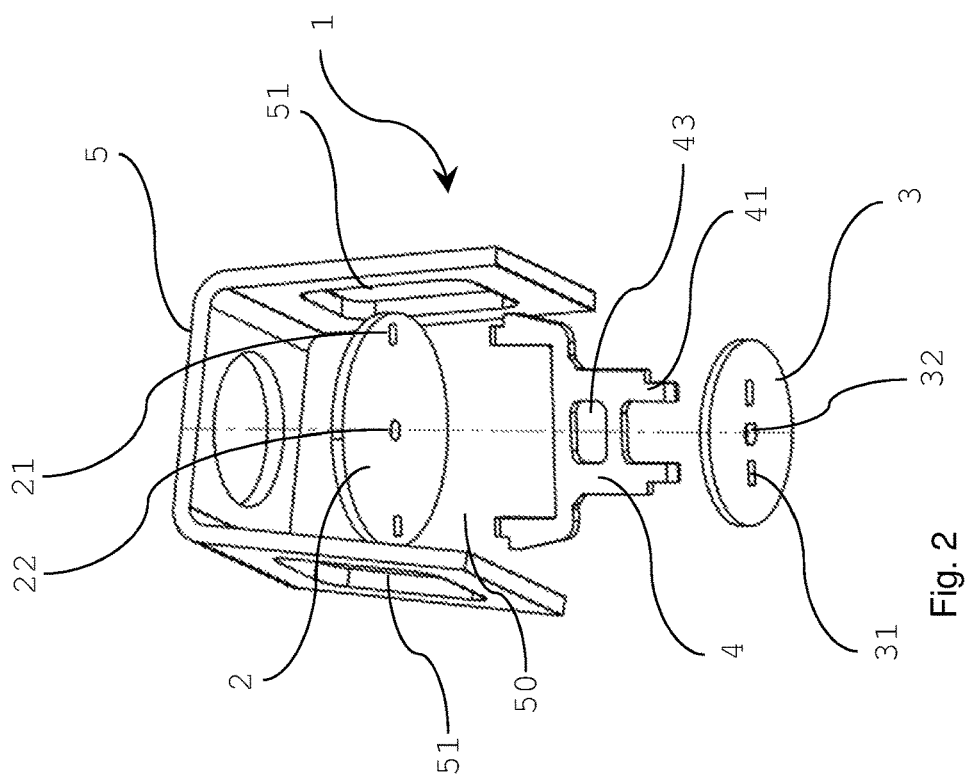
FIG. 2 is an exploded view of a further embodiment according to the present invention.

As can be seen in FIG. 2, the rotational disc members 2, 3 present central shaft apertures 22, 32 and the shafts 20, 30 are inserted into the central shaft apertures 22, 32 in the rotational disc members 2, 3 and particularly do not form an integral part of the respective rotational member 2, 3, hence further thermally decoupling the valve shaft 30 from the actuator 20. In the exploded view of FIG. 2, the slots 21, 31 for receiving the engagement pins 41 of the bridge element 4 can be seen. The central shaft aperture 22, 32 in the rotational disc members 2, 3 particularly have a circular cross-section which is flattened on one side for fitting with respective shafts 20, 30 which have corresponding circular cross-sections which are flattened on one side too and therefore have a circumference corresponding to the aperture 22, 32 of the rotational disc member. The shafts 20, 30 can be inserted into the central shaft apertures 22, 32 for a form-locking engagement of the shafts 20, 30 with the respective rotational disc members 22, 32. The cross-section of the central shaft aperture may, of course, have any shape corresponding to the shape of the respective shaft to be introduced, including a circular shape. Other shapes may be used for coupling the shaft with the respective rotational member, as, for example a circular cross-section flattened at two side, a star shaped cross-section, an oval, triangular or rectangular cross-section, etc. Any shape preventing rotation, hence non circular, is particularly usable.

Figure 3:
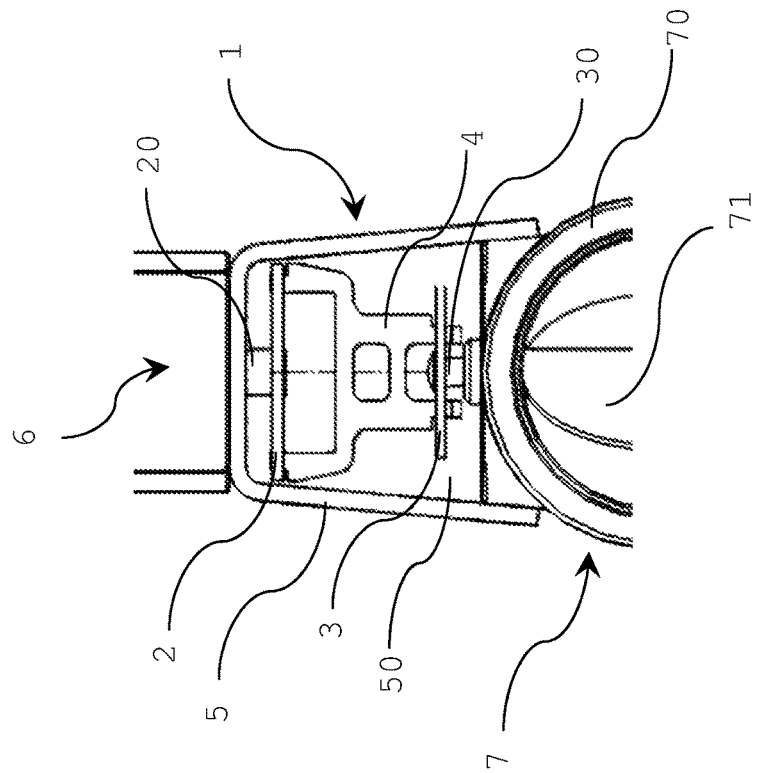
FIG. 3 is a side view of an assembled valve unit according to an embodiment of the present invention.

Additionally, in the embodiment illustrated in FIG. 2 and FIG. 3, the mechanical coupler 1 comprises a support element 5 for maintaining a defined distance between the actuator shaft and the valve shaft. To that purpose, as seen for the valve unit shown in FIG. 3, the support element 5 supports the actuator 6 with respect to the valve 7. The support element 5 is surrounding the rotational disc members 2, 3 and the bridge element 4 and defines an inner volume 50. The support element 5 has openings 51 for allowing the surrounding atmosphere to enter and to exit the inner volume 50 of the support element 5, in particular for ambient air to enter the inner volume 50 of the support element 5 for cooling the mechanical coupler 1. Additionally, the support element shields and protects the mechanical coupler to minimize the risk for damage and limits the heat conduction from valve housing to actuator.

FIG. 3 is a side view of an assembled valve unit according to an embodiment of the present invention. The first rotational member 2 is coupled to the actuator shaft 20 of the actuator 6, while the second rotational member 3 is coupled to the valve shaft 30 of the valve 7 comprising a valve housing 70 and one valve flap 71 arranged in the housing 70. The valve flap 71 is fixedly arranged on the rotatable valve shaft 30. The support element 5 contacts at one end the actuator 6 and contacts at the other end the valve housing 70 of the valve 7 having one flap 71.

Figure 4:
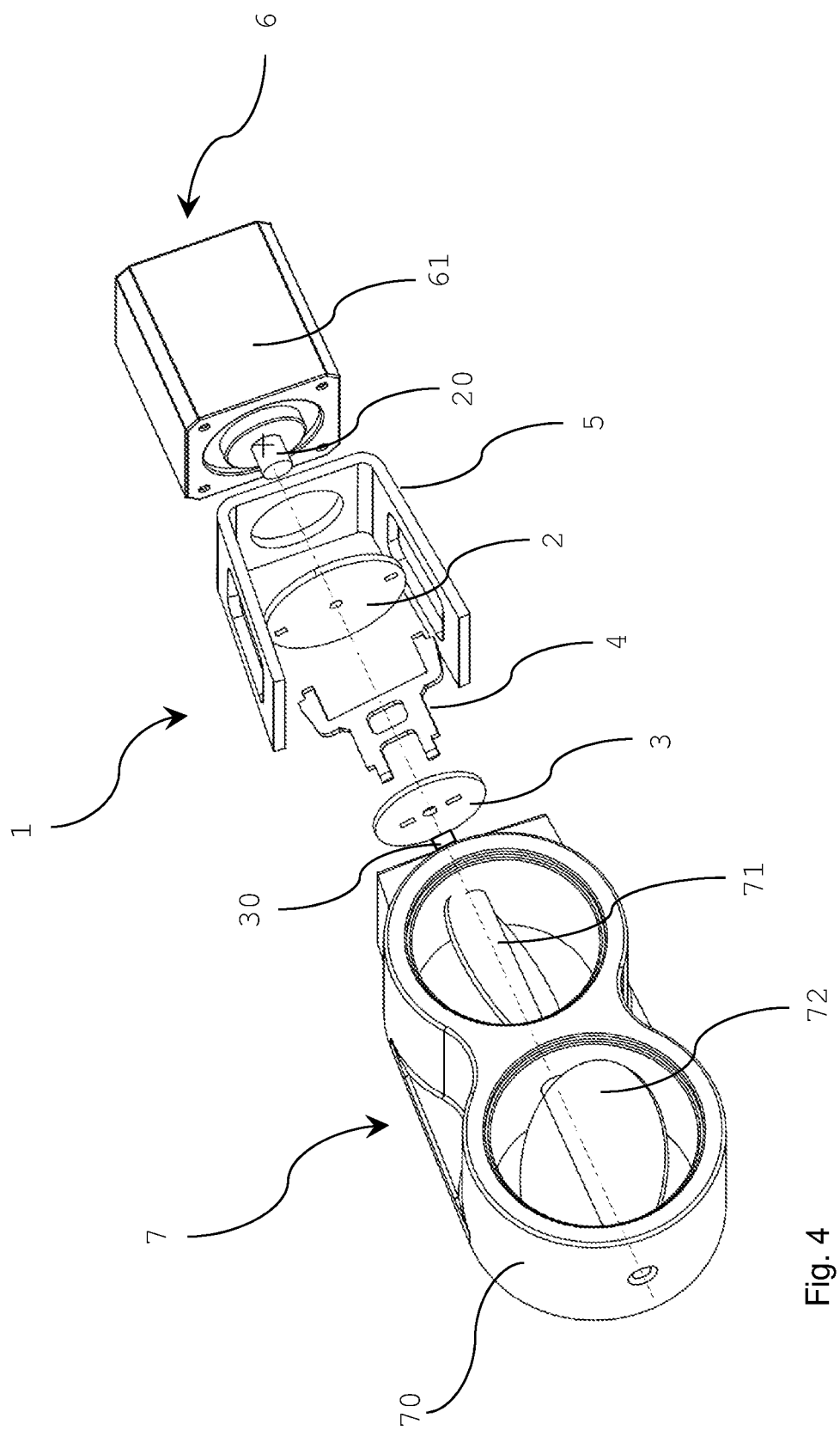
FIG. 4 shows an exploded perspective view of a valve unit with a mechanical coupler coupling an actuator and a valve according to one embodiment of the invention.

In FIG. 4 an embodiment of a valve unit according to the invention is shown. The mechanical coupler 1 is coupled to a valve shaft 30 of a valve 7 for an exhaust gas stream, the valve 7 comprising a valve housing 70, two valve flaps 71, 72 arranged in the housing 70, the valve flaps 71, 72 being fixedly arranged on a rotatable valve shaft 30. The first valve flap 71 may be connected to a first conduit to a heat exchanger through which—depending on the mode of operation—an exhaust gas stream may flow, while second valve flap 72 is connected to a conduit through which—depending on the mode of operation—the exhaust gas stream may flow, alternatively. With the aid of the valve 7 it is determined whether the exhaust gas stream flows through the first conduit and through the heat exchanger or through the second conduit and thereby bypassing the heat exchanger. Of course, any other valve assembly may be coupled with the present mechanical coupler. The valve 7 may of course also comprise valve seats which the valve flaps may cooperate with.

As shown in FIGS. 5a to 5d, the rotational members 2 and 3 may have a variety of configurations.

Figure 5A:
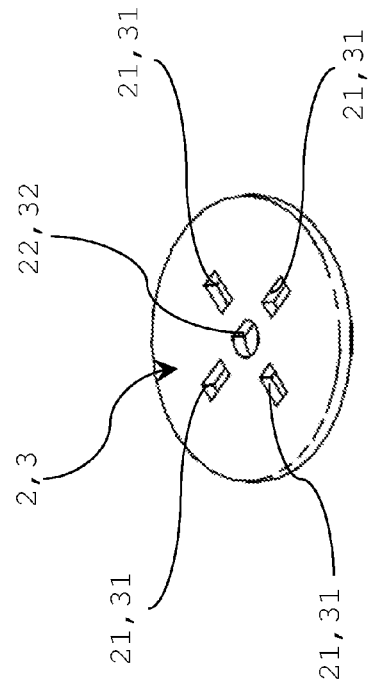
FIGS. 5a to 5d illustrate various embodiments for the rotational members according to the invention.
Figure 5B:
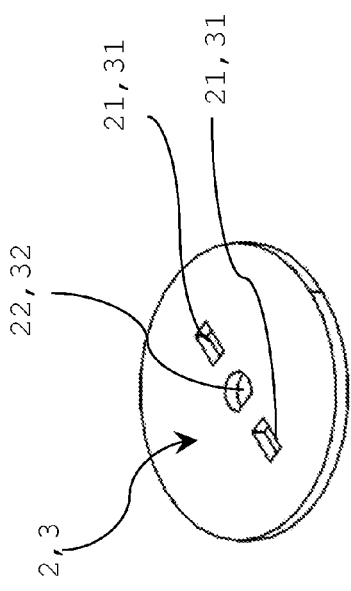

FIGS. 5a and 5b illustrate rotational members 2, 3 having the shape of a disc. They may have two slots 21, 31 for receiving a pair of engagement pins 41 from the bridge element 4 as shown in FIG. 5a. Alternatively, the rotational disc member 2, 3 may have four slots 21, 31 for receiving two pairs of engagement pins 41 from two assembled bridge elements 4 formed by stacking.

Figure 5C:
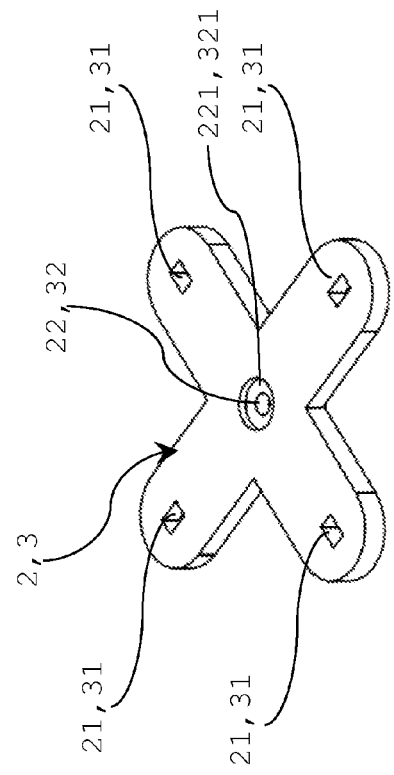
Figure 5D:
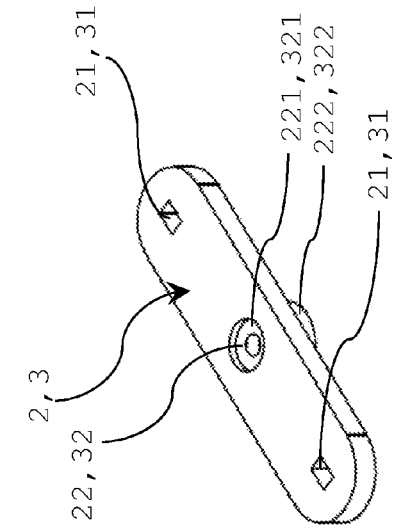

Alternatively, the rotational members 2, 3 may have the shape of elongated plates having two slots 21, 31 or plates in cross shape having four slots 21, 31 as illustrated in FIG. 5c and FIG. 5d. In these figures, the rotational member 2, 3 also includes intrusions 221, 321 or extrusions 222, 322. When rotational members 2, 3 made out of metal are formed by a stamping process or another machining process, these intrusions 221, 321 or extrusions 222, 322 may be formed by this process. A rotational member 2, 3 made out of metal may also be formed by casting, in particular from cast aluminum and the intrusions 221, 321 or extrusions 222, 322 are formed during this process. The thickness of the rotational member is to be understood without considering the intrusions or extrusions in the rotational member.

All illustrated embodiments of the rotational members have in common a central shaft aperture 22, 32 for a form-locking engagement of the shafts 20, 30 with the respective rotational members 22, 32. In preferred embodiments, the first and second rotational members are parallel disc members, or the first and second rotational members are parallel elongated plates or plates in cross shape.

Particularly, the rotational members 2, 3 are made of metal, particularly steel, in particular from a sheet of steel, or of cast aluminum, or of ceramic. The rotational members particularly have a thickness of from 0.5 mm to 3 mm, particularly from 1 mm to 2 mm, very particularly 1.5 mm.

The bridge element may as well have a variety of configurations as illustrated in FIG. 6a to FIG. 6f. All bridge elements 4 illustrated have two orthogonal symmetry planes, the sagittal plane and the coronal plane, intersecting at the rotational axis 10 of the mechanical coupler 1.

FIG. 6a illustrates one planar bridge element 4 according to the present invention which has a ladder type shape with a pair of engagement pins 41 on each of the opposite ends of the elongated plane formed by the planar bridge element 4. The body 42 of the planar bridge element from which the engagement pins 41 are projecting, is rectangular, the elongated part of the rectangle being in direction of the rotational axis 10 of the mechanical coupler 1. This structure is one of the most elementary for the planar bridge element 4 according to the present invention, and yet very efficient in terms of thermal decoupling for maximized temperature drop between the hot valve shaft 30 and the actuator shaft 20.

The bridge element 4 has a planar shape for extending from the first rotational member to the second rotational member, and the planar bridge element 4 has two engagement pins 41 projecting from the square body 42 in the same plane as the body 42 of the planar bridge element 4 at each of the two opposite ends of the elongated part of the planar bridge element 4. The planar bridge element 4 furthermore comprises one rectangular through-hole 43 traversing the plane of the planar bridge element 4, the rectangular through-hole 43 also having the elongated part of the rectangle being in direction of the rotational axis 10 of the mechanical coupler. In this illustrated embodiment, the body 42 is also symmetrical with respect to a plane perpendicular to the rotational axis 10 (transverse plane).

FIG. 6b depicts another planar bridge element 4 similar to the bridge element 4 shown in FIG. 6a, except that the body 42 of the planar bridge element 4 has a square shape, and the pins are projecting from the square body in the same plane as the body 42 of the planar bridge element 4. The through-hole 43 also has a square shape. The engagement pins 41 are projecting from the body 42 of the bridging element 4 at a distance from the edge of the square body. In this illustrated embodiment, the body 42 is also symmetrical with respect to a plane perpendicular to the rotational axis 10 (transverse plane).

FIG. 6c and FIG. 6d show other embodiments of the planar bridge element in which the body 42 of the bridge element 4 has an elongation in normal direction to the rotational axis 10 of the mechanical coupler 1, the elongation exceeding by at least 20%, particularly by at least 30% the distance between the centers of at least one pair of the end portions 44 of the engagement pins 41 engaging the first and/or the second rotational member 2, 3. The body 42 of the planar bridge element 4 has at least one elongated through-hole 43 in direction of the elongation of the body 42 of the planar bridge element 4 traversing the plane of the body of the planar bridge element 4 extending from the first rotational member 2 to the second rotational member 3. The bodies 42 in the embodiments shown in FIG. 6c and FIG. 6d, are also symmetrical along the normal of the rotational axis 10 (transverse plane).

Figure 6E:
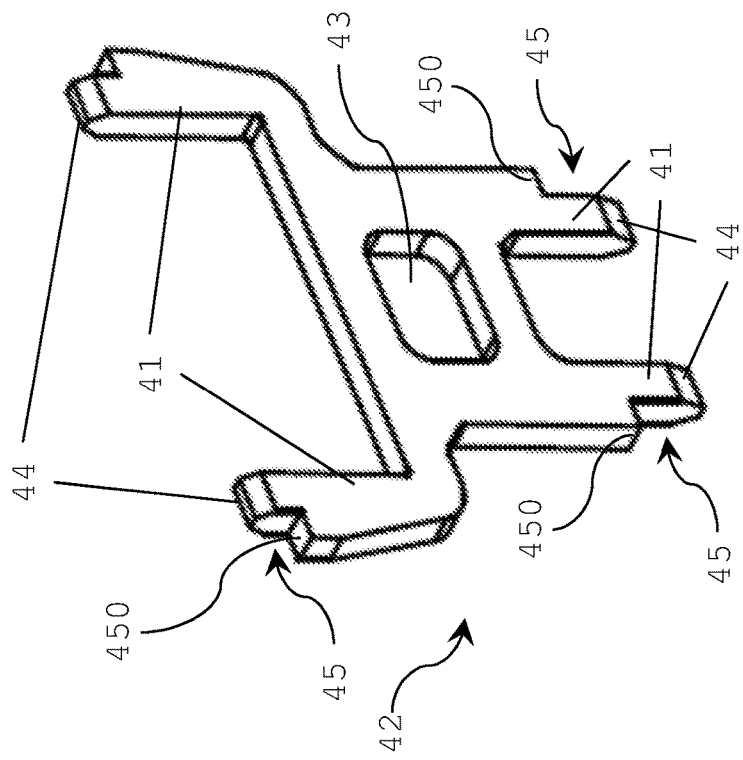

FIG. 6e shows another embodiment of a bridging element 4 according to the present invention. The body 42 is asymmetrical with respect to a plane perpendicular to the rotational axis 10 (transverse plane) and the distance between the centers of the end portions (44) of the engagement pins (41) engaging one rotational member differs from the distance between the centers of the end portions (44) of the engagement pins (41) the second rotational member.

FIG. 6f shows a further embodiment of a planar bridge element 4 according to the invention wherein the body 42 of the bridge element 4 has a rectangular elongation in normal direction to the rotational axis 10 of the mechanical coupler 1, the elongation exceeding by at least 20%, particularly by at least 30% the distance between the centers of the end portions 44 of the engagement pins 41 engaging the rotational members. The body 42 of the planar bridge element 4 has three through-holes 43 traversing the plane of the body 42 of the bridge element 4. In this illustrated embodiment, the body 42 is symmetrical again along the normal of the rotational axis 10 (transverse plane).

Of course, the through-hole(s) 43 traversing the plane of the body 42 of the bridge element 4 may have any other shape, such as, for example circular, oval, rectangular, V-shaped, trapezoidal, etc.

FIG. 7a to FIG. 7c illustrate another embodiment of the present invention wherein the bridge element 4 has a shape such that two planar bridge elements 4 may be assembled axially by stacking and thereby forming cross-like shaped assembled bridge elements. To this purpose, the planar bridge element 4 has a longitudinal recess along the rotational axis of the mechanical coupler in which a second planar bridge element 4 also having a longitudinal recess along the rotational axis of the mechanical coupler may be introduced, thereby forming a stacked bridge element assembly with four engagement pins (41) on each opposite end of the bridge element assembly.

Particularly, the planar bridge element 4 is made of metal, particularly steel, in particular from a sheet of steel, or of cast aluminum, or of ceramic. The rotational members particularly have a thickness of from 0.5 mm to 3 mm, particularly from 1 mm to 2 mm, very particularly 1.5 mm. The bridge element may be formed by stamping, laser cut, or any other method known in the art.

Figure 8:
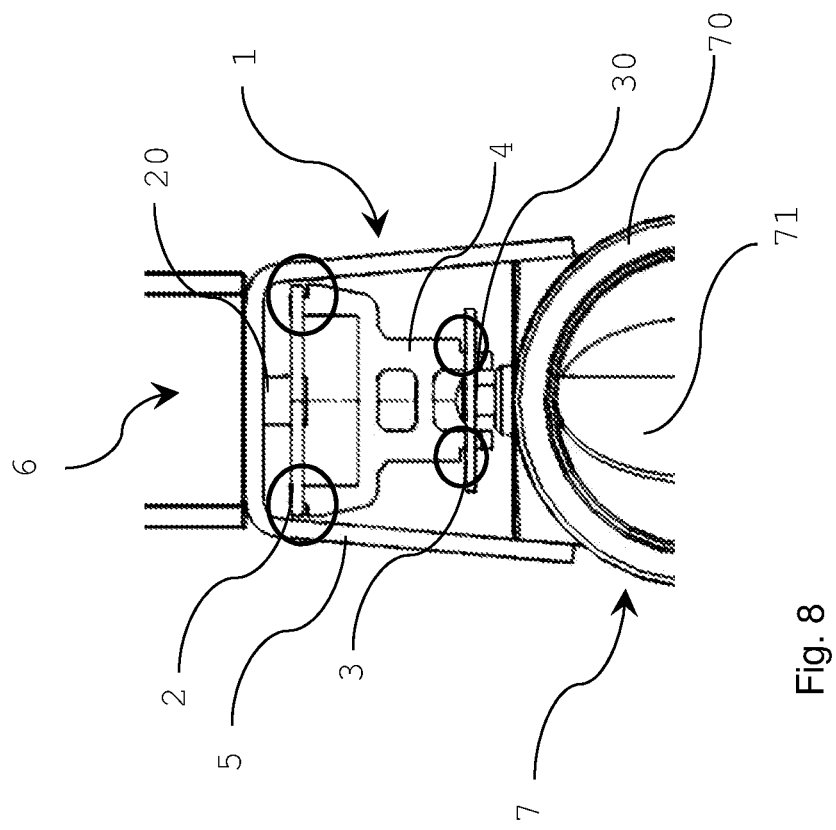
FIG. 8 illustrates the clearance between the rotational members and the bridge element in a valve unit according to one embodiment of the invention.

FIG. 8 illustrates a mechanical coupler according the invention, wherein the end portions 44 of the engagement pins 41 of the planar bridge element 4 have indentations 45 comprising a shoulder 450 at the proximal end of the end portion 44 of the engagement pins 41 as shown in FIG. 6e and FIG. 6f. These indentations 45 are locking the bridge element 4 via the shoulder 450 of the indentations 45 between the first and the second rotational members 2, 3. In this particular embodiment, the indentations 45 are designed such that the mechanical coupler has a clearance (encircled parts) between the shoulder 450 of the indentation 45 and at least one of the respective rotational member 2, 3.

Figure 9:
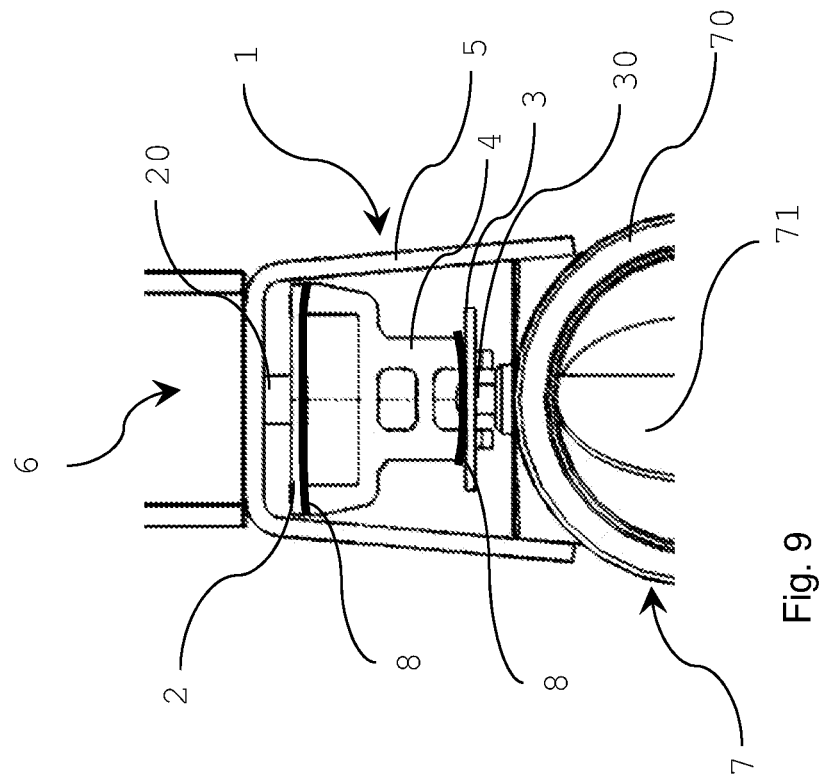
FIG. 9 depicts a spring-biased bridge element in a valve unit according to one embodiment of the invention.

In a preferred embodiment, the mechanical coupler is spring-biased, for example as shown on the example in FIG. 9. For compensating misalignments and tolerance deviations of the parts and avoid rattling noises which could emanate from the mechanical coupler under certain conditions, for example due to vibrations.

In FIG. 9, the planar bridge element 4 is axially spring-biased by one spring washer 8 between the first rotational member 2 and the bridge element 4 or between the second rotational element 3 and the bridge element or between the first rotational member 2 and the bridge element 4 and between the second rotational element 3 and the bridge element. The bridge element or the spring washer 8 axially biases the first rotational member with respect to the second rotational member. Specifically, the spring washer 8 can apply a force that acts along the axis of the mechanical coupler 1 and concurrently applies a reaction force that acts along the axis of the shafts. These oppositely acting forces tend to eliminate looseness and avoid motion of the bridge element 4 between the rotational members and substantially reducing thereby the rattling noise of the mechanical coupler 1. Moreover, the spring washer will exert sufficient frictional forces to the bridge element and the rotational member and prevent rattling noise due to backlash in radial direction or clearance in axial direction.

Various aspects of the mechanical coupler according to the invention have been described with the aid of the embodiments. However, the invention is not limited to the embodiments or the particular combination of aspects shown in the embodiments, as various changes and modifications to the shown embodiments are conceivable without departing from the technical teaching underlying the invention. Therefore, the scope of protection is defined only by the appended claims.

The invention claimed is:

1. Valve unit in particular for controlling a flow rate of an exhaust gas through a passage of a valve, the valve unit comprising
   the valve having a valve housing, at least one valve flap, the at least one valve flap being fixedly arranged on a rotatable valve shaft having a rotational axis,
   an actuator for actuating the valve flap, the actuator having an actuator shaft with a rotational axis,
   a mechanical coupler for rotational coupling of the actuator shaft and the valve shaft, the actuator shaft and the valve shaft being coaxial, the mechanical coupler comprising
   a rotational axis coinciding with the rotational axis of the actuator shaft and the rotational axis of the valve shaft,
   a first rotational member coupled to the actuator shaft and a second rotational member coupled to the valve shaft, and a bridge element for transmitting a force between the first rotational member and the second rotational member,
   the first and the second rotational members having slots for receiving at least two engagement pins of the bridge element,
   wherein the bridge element has a planar shape extending from the first rotational member to the second rotational member, and the planar bridge element has a body and the at least two engagement pins project from the body of the planar bridge element in the same plane as the body at each of two of opposite ends of the body of the planar bridge element in a parallel direction to the rotational axis of the mechanical coupler, the engagement pins engaging with the corresponding slots in the rotational members, and the planar bridge element comprising at least one through-hole traversing the plane of the body of the planar bridge element extending from the first rotational member to the second rotational member, wherein the body of the planar bridge element comprises a coronal plane containing the rotational axis of the mechanical coupler, and the rotational axis of the mechanical coupler lies in the coronal plane of the body of the planar bridge element.

2. Valve unit according to claim 1, wherein the engagement pins of the planar bridge element have end portions and wherein the distance between the centers of the end portions of the engagement pins engaging the first rotational member differs from the distance between the centers of the end portions of the engagement pins engaging the second rotational member.

3. Valve unit according to claim 1, wherein the mechanical coupler presents a backlash between the slots of the rotational members and the engagement pins of the planar bridge element engaging the corresponding slots of the rotational members.

4. Valve unit according to claim 1, wherein at least one of the first and second rotational members is a disc member or an elongated plate or a plate in cross shape and is normal to the rotational axis of the mechanical coupler.

5. Valve unit according to claim 2, wherein the first and second rotational members are parallel disc members.

6. Valve unit according to claim 2, wherein the first and second rotational members are both parallel elongated plates or both parallel plates in cross shape.

7. Valve unit according to claim 1, wherein end portions of the engagement pins of the planar bridge element are tapering towards the distal end of the engagement pins over at least part of the end portions, the end portions having a triangular or a trapezoidal shape tapering towards the distal end of the engagement pins.

8. Valve unit according to claim 1, wherein an end portion of the engagement pins of the planar bridge element have indentations comprising shoulders at the proximal end of the end portion of the engagement pins for locking the bridge element between the first and the second rotational members.

9. Valve unit according to claim 8, wherein the indentations have a shape such that the mechanical coupler has a clearance between the shoulder of the indentation of the planar bridge element and the respective rotational member.

10. Valve unit according to claim 1, wherein the planar bridge element is spring-biased for maintaining the bridge element biased in the mechanical coupler.

11. Valve unit according to claim 1, wherein the planar bridge element has a shape such that two planar bridge elements are configured to be assembled axially by stacking and thereby forming cross-like shaped assembled bridge elements.

12. Valve unit according to claim 1, wherein the body of the planar bridge element has an elongation in normal direction to the rotational axis of the mechanical coupler, the elongation exceeding by at least 20% of the distance between the centers of at least one pair of the end portions of the engagement pins engaging the first or the second rotational member.

13. Valve unit according to claim 12, wherein the body of the planar bridge element comprises the at least one elongated through-hole in direction of the elongation of the body of the planar bridge element and traversing the plane of the body of the planar bridge element extending from the first rotational member to the second rotational member.

14. Valve unit according to claim 1, wherein the coupler comprises a support element for maintaining a defined distance between the actuator shaft and the valve shaft.

15. Valve unit according to claim 1, wherein the rotational members are made of a metal or of a ceramic material, the rotational members having a thickness of 1 mm to 4 mm and the bridge element is made of a metal or a ceramic material, the bridge element having a thickness of 0.5 mm to 3 mm.

16. Valve unit according to claim 1, wherein the planar bridge element is biased for maintaining the bridge element biased in the mechanical coupler.

17. Valve unit in particular for controlling a flow rate of an exhaust gas through a passage of a valve, the valve unit comprising
the valve having a valve housing, at least one valve flap, the at least one valve flap being fixedly arranged on a rotatable valve shaft having a rotational axis,
an actuator for actuating the valve flap, the actuator having an actuator shaft with a rotational axis,
a mechanical coupler for rotational coupling of the actuator shaft and the valve shaft, the actuator shaft and the valve shaft being coaxial, the mechanical coupler comprising
a rotational axis coinciding with the rotational axis of the actuator shaft and the rotational axis of the valve shaft,
a first rotational member coupled to the actuator shaft and a second rotational member coupled to the valve shaft, and a bridge element for transmitting a force between the first rotational member and the second rotational member,
the first and the second rotational members having slots for receiving at least two engagement pins of the bridge element,
wherein the bridge element has a planar shape extending from the first rotational member to the second rotational member, and the planar bridge element has a body and the at least two engagement pins project from the body of the planar bridge element at each of two of opposite ends of the body of the planar bridge element in a parallel direction to the rotational axis of the mechanical coupler, the engagement pins engaging with the corresponding slots in the rotational members, and the planar bridge element comprising at least one through-hole traversing the plane of the body of the planar bridge element extending from the first rotational member to the second rotational member,
wherein an end portion of the engagement pins of the planar bridge element have indentations comprising shoulders at the proximal end of the end portion of the engagement pins for locking the bridge element between the first and the second rotational members.

18. Valve unit in particular for controlling a flow rate of an exhaust gas through a passage of a valve, the valve unit comprising
the valve having a valve housing, at least one valve flap, the at least one valve flap being fixedly arranged on a rotatable valve shaft having a rotational axis,
an actuator for actuating the valve flap, the actuator having an actuator shaft with a rotational axis,
a mechanical coupler for rotational coupling of the actuator shaft and the valve shaft, the actuator shaft and the valve shaft being coaxial, the mechanical coupler comprising
a rotational axis coinciding with the rotational axis of the actuator shaft and the rotational axis of the valve shaft,
a first rotational member coupled to the actuator shaft and a second rotational member coupled to the valve shaft, and a bridge element for transmitting a force between the first rotational member and the second rotational member,
the first and the second rotational members having slots for receiving at least two engagement pins of the bridge element,
wherein the bridge element has a planar shape extending from the first rotational member to the second rotational member, and the planar bridge element has a body and the at least two engagement pins project from the body of the planar bridge element at each of two of opposite ends of the body of the planar bridge element in a parallel direction to the rotational axis of the mechanical coupler, the engagement pins engaging with the corresponding slots in the rotational members, and the planar bridge element comprising at least one through-hole traversing the plane of the body of the planar bridge element extending from the first rotational member to the second rotational member, wherein the body of the planar bridge element comprises a coronal plane containing the rotational axis of the mechanical coupler, wherein an end portion of the engagement pins of the planar bridge element have indentations comprising shoulders at the proximal end of the end portion of the engagement pins for locking the bridge element between the first and the second rotational members.

19. Valve unit according to claim 18, wherein the indentations have a shape such that the mechanical coupler has a clearance between the shoulder of the indentation of the planar bridge element and the respective rotational member.

* * * * *